United States Patent
Adams

(10) Patent No.: US 10,988,212 B2
(45) Date of Patent: Apr. 27, 2021

(54) MODULAR MOORING BUOY SYSTEM, AND BUOYANT BODY AND MODULAR UNIT THEREOF

(71) Applicant: JKP Marine Pty Ltd, Mount Claremont (AU)

(72) Inventor: Robert William Adams, Mount Claremont (AU)

(73) Assignee: JKP MARINE PTY LTD, Mount Claremont (AU)

( * ) Notice: Subject to any disclaimer, the term of this patent is extended or adjusted under 35 U.S.C. 154(b) by 0 days.

(21) Appl. No.: 16/466,417

(22) PCT Filed: Dec. 5, 2017

(86) PCT No.: PCT/AU2017/000259
§ 371 (c)(1),
(2) Date: Jun. 4, 2019

(87) PCT Pub. No.: WO2018/102851
PCT Pub. Date: Jun. 14, 2018

(65) Prior Publication Data
US 2019/0329844 A1    Oct. 31, 2019

(30) Foreign Application Priority Data
Dec. 5, 2016   (AU) ............................ 2016905003

(51) Int. Cl.
*B63B 22/16*   (2006.01)
*B63B 22/02*   (2006.01)
*H04B 1/3827*  (2015.01)

(52) U.S. Cl.
CPC .............. *B63B 22/16* (2013.01); *B63B 22/02* (2013.01); *H04B 1/3827* (2013.01)

(58) Field of Classification Search
CPC ........ B63B 22/16; B63B 22/02; H04B 1/3827
See application file for complete search history.

(56) References Cited

U.S. PATENT DOCUMENTS

| | | | | |
|---|---|---|---|---|
| 3,563,626 | A * | 2/1971 | Ferdinand et al. | A47B 57/425 312/242 |
| 5,603,415 | A * | 2/1997 | Balnis, Jr. ............ | A47B 81/068 211/40 |
| 6,179,525 | B1 * | 1/2001 | Gruhn ...................... | B63B 3/08 114/263 |
| 9,834,283 | B2 * | 12/2017 | Adams ................... | G07B 15/00 |
| 2006/0153643 | A1 * | 7/2006 | Basta ....................... | B63B 3/08 405/219 |

FOREIGN PATENT DOCUMENTS

WO    WO-2016015089 A1 *    2/2016    ........... G07B 15/063

* cited by examiner

*Primary Examiner* — Stephen P Avila
(74) *Attorney, Agent, or Firm* — P. G. Scott Born; Foster Garvey PC

(57) ABSTRACT

There is disclosed a modular mooring buoy system comprising: a buoyant body having an associated controller unit, the buoyant body being formed with at least one outwardly opening recess (131); and at least one modular unit (200) removably received by the at least one recess (131) in a watertight manner to enable operative communication between the controller unit and the at least one modular unit (200).

20 Claims, 6 Drawing Sheets

MODULAR MOORING BUOY SYSTEM, AND BUOYANT BODY AND MODULAR UNIT THEREOF

FIELD

The present disclosure relates generally to a mooring buoy system, more particular to a modular mooring buoy system, and a buoyant body and a modular unit thereof.

BACKGROUND

Conventional mooring buoys provide anchoring points to which marine vessels, such as ships, can be moored. PCT Patent Application No. PCT/AU2015/000447 discloses such a mooring buoy system comprising a buoyant body, an attachment point, a controller, an RF communication device, and a movement sensor. The RF communication device is operable for receiving a vessel ID of a marine vessel. The movement sensor is operable to detect movement of the buoyant body. The controller is arranged to determine when the marine vessel is moored to the mooring buoy based on the vessel ID received by the RF communication device and the movement of the buoyant body detected by the movement sensor. The above electronic components are implemented on a single printed circuit board (PCB) module.

SUMMARY

According to one aspect of the present disclosure, there is provided a modular mooring buoy system comprising: a buoyant body having an associated controller unit, said buoyant body being formed with at least one outwardly opening recess; and at least one modular unit removably received by said at least one recess in a watertight manner to enable operative communication between said controller unit and said at least one modular unit.

According to another aspect, there is provided a mooring buoy comprising: a buoyant body; and a controller unit associated with said buoyant body, said buoyant body being formed with at least one outwardly opening recess, said at least one recess being adapted to removably receive at least one modular unit in a watertight manner to enable operative communication between said controller unit and the at least one modular unit.

According to another aspect, there is provided a modular unit for use with a buoyant body having an associated controller unit, the buoyant body being formed with an outwardly opening recess, wherein said modular unit is adapted to be received removably by the recess in a watertight manner to enable operative communication between said modular unit and the controller unit.

BRIEF DESCRIPTION OF DRAWINGS

At least one embodiment of the present disclosure will now be described with reference to the drawings, among which.

DETAILED DESCRIPTION

It will be understood that various elements and/or functions as described in respect of one or more examples and/or embodiments may also be used in other examples and/or embodiments.

Figure 1A:
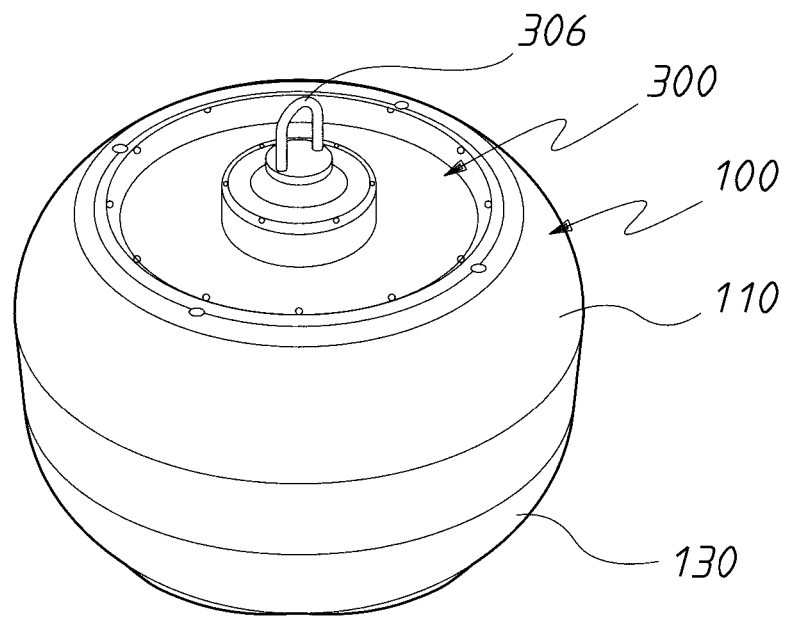
FIGS. 1A and 1B are upper and lower perspective views of an example embodiment of a modular mooring buoy system according to the present disclosure, respectively.
Figure 1B:
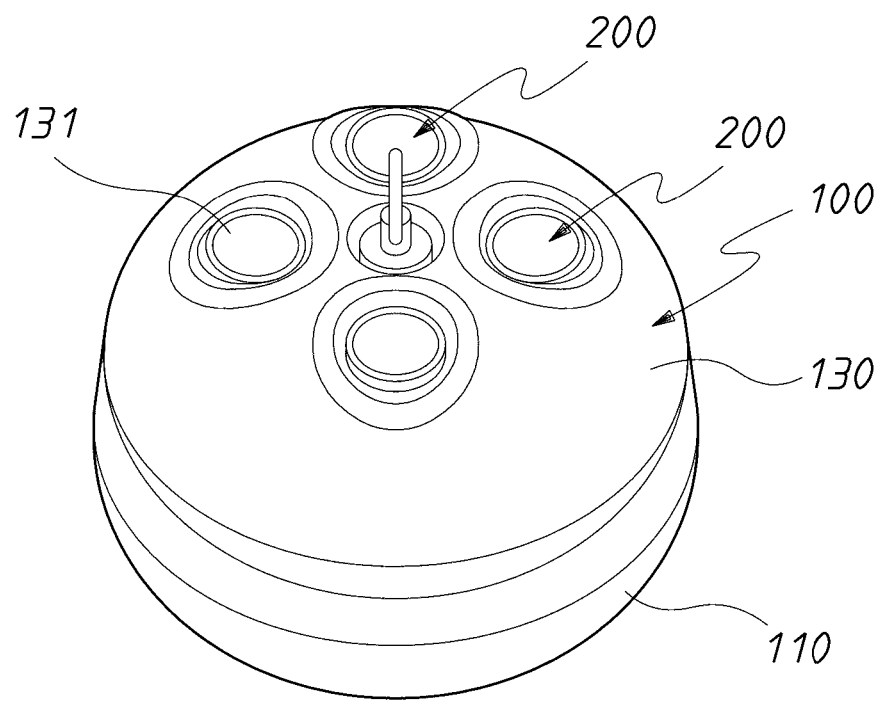
Figure 2A:
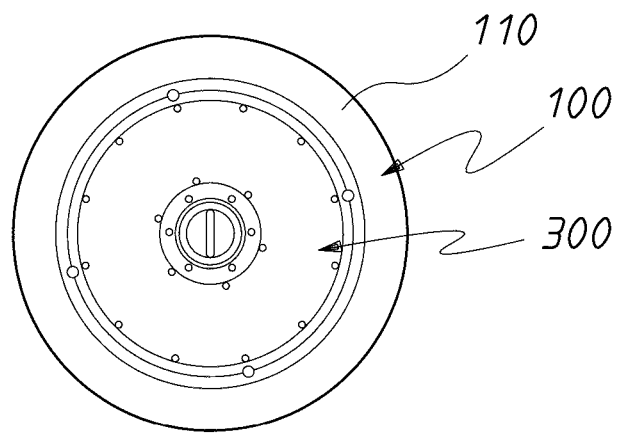
FIGS. 2A to 2C are schematic top, side and bottom views of the system, respectively.
Figure 2B:
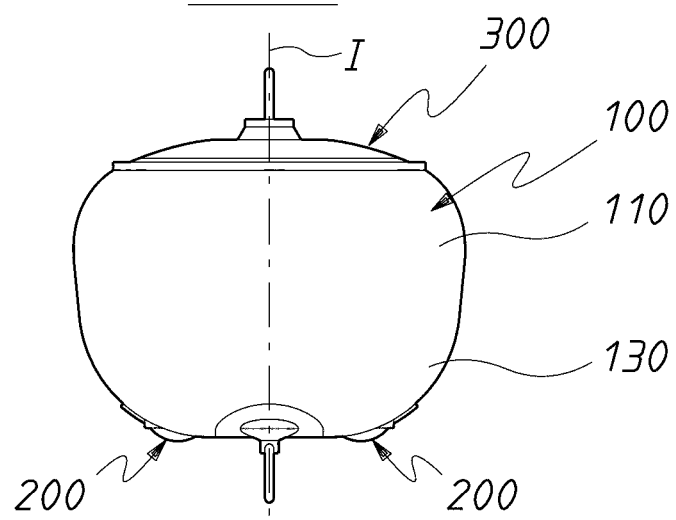
Figure 2C:
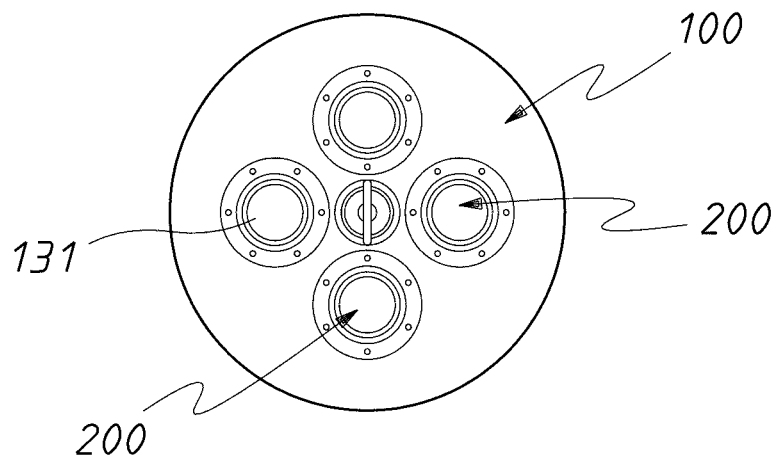
Figure 3:
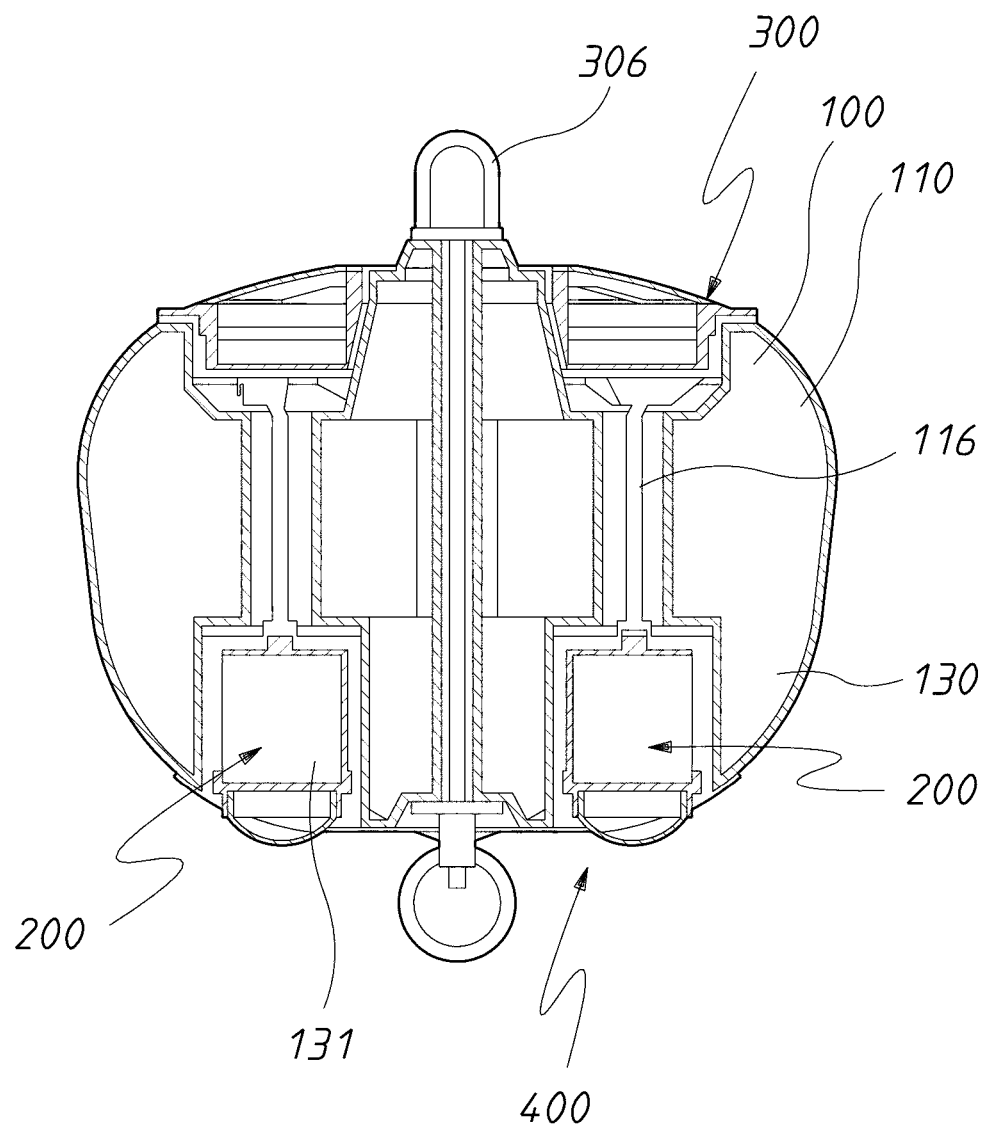
FIG. 3 is a schematic cross-section view of the system.

An embodiment of a modular mooring buoy system according to the present disclosure is shown in FIGS. 1A and 1B (upper and lower perspective views, respectively), FIGS. 2A-2C (top, side and lower schematic views, respectively), and FIG. 3 (a cross-sectional schematic view). As can be seen from the figures, the modular mooring buoy system comprises a buoy 100 and a plurality of modular units 200. By way of example, the modular units 200 are exemplified to take the form of a cartridge.

The buoy 100 comprises a buoyant body made of a material suitable for use in water, particularly sea water (e.g., a polycarbonate material). The buoyant body is generally spherical in shape and has an upper body portion 110 and a lower body portion 130. The upper body portion 110 is formed with a mooring eye 306 for mooring of, for example, a boat (see, for example, FIG. 1A).

The buoyant body has an associated controller assembly 300, and has a controller unit that forms part of the controller assembly 300. The buoyant body is formed with a plurality of outwardly opening recesses 131. The modular units 200 are removably and substantially received by the recesses 131 in a watertight manner, respectively, to enable operative communication between the modular units 200 and the controller unit of the controller assembly 300, which will be described below in further detail.

Figure 4:
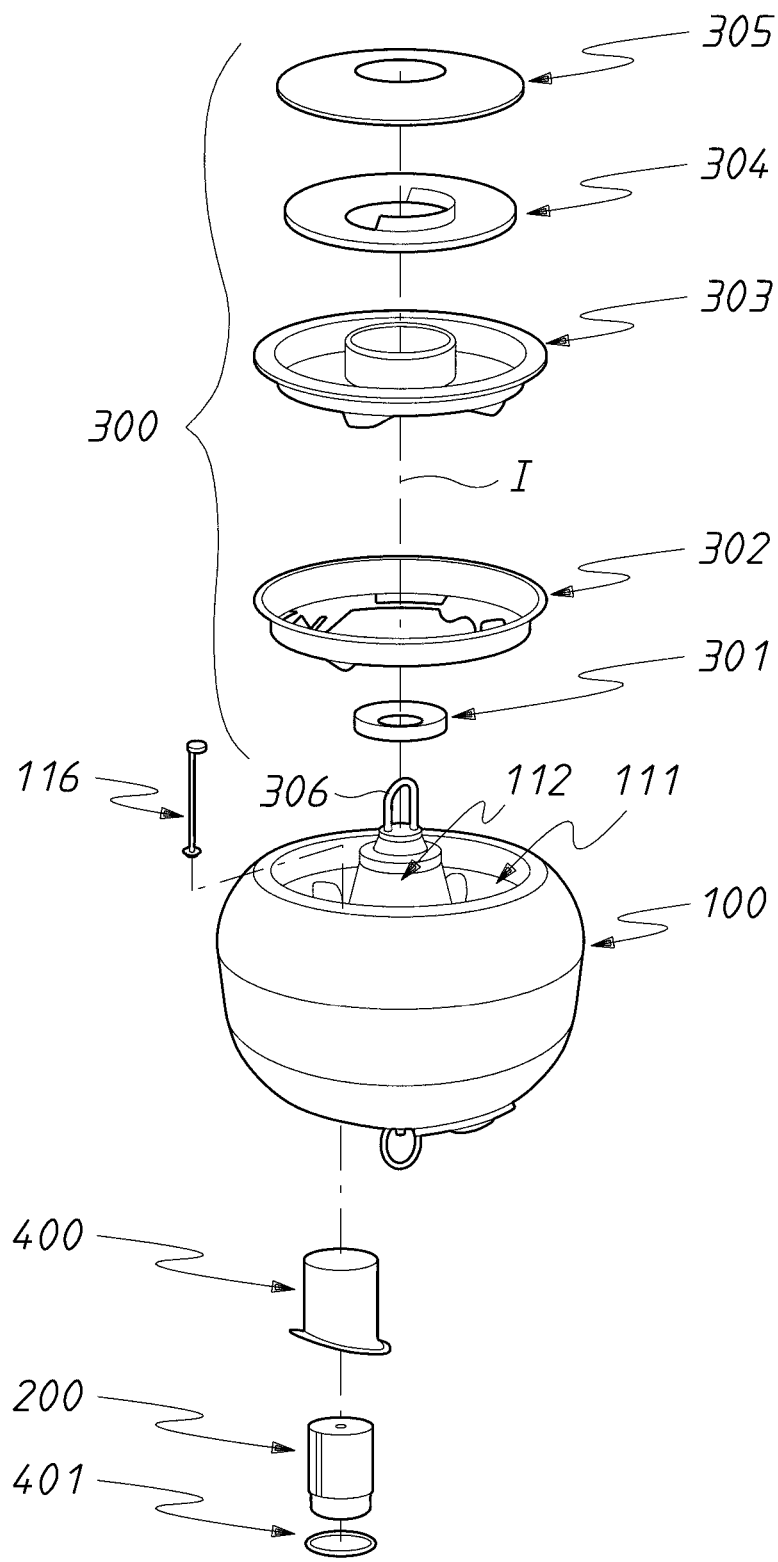
FIG. 4 is an exploded perspective view of the system.

The recesses 131 are arranged equi-angularly and equi-distantly with respect to a central axis "I" of the buoyant body (see FIGS. 2b and 4). The recesses 131 are formed in the lower body portion 130 and are defined by respective inner surrounding walls in the lower body portion 130 that extend along the central axis "I". The recesses 131 are arranged such that the respective modular units 200 therein come into contact with water in use. However, in other embodiments, a portion of the recesses 130 may, for example, be otherwise arranged. For example, the portion of recess may be formed instead in the upper body portion 110.

Figure 5:
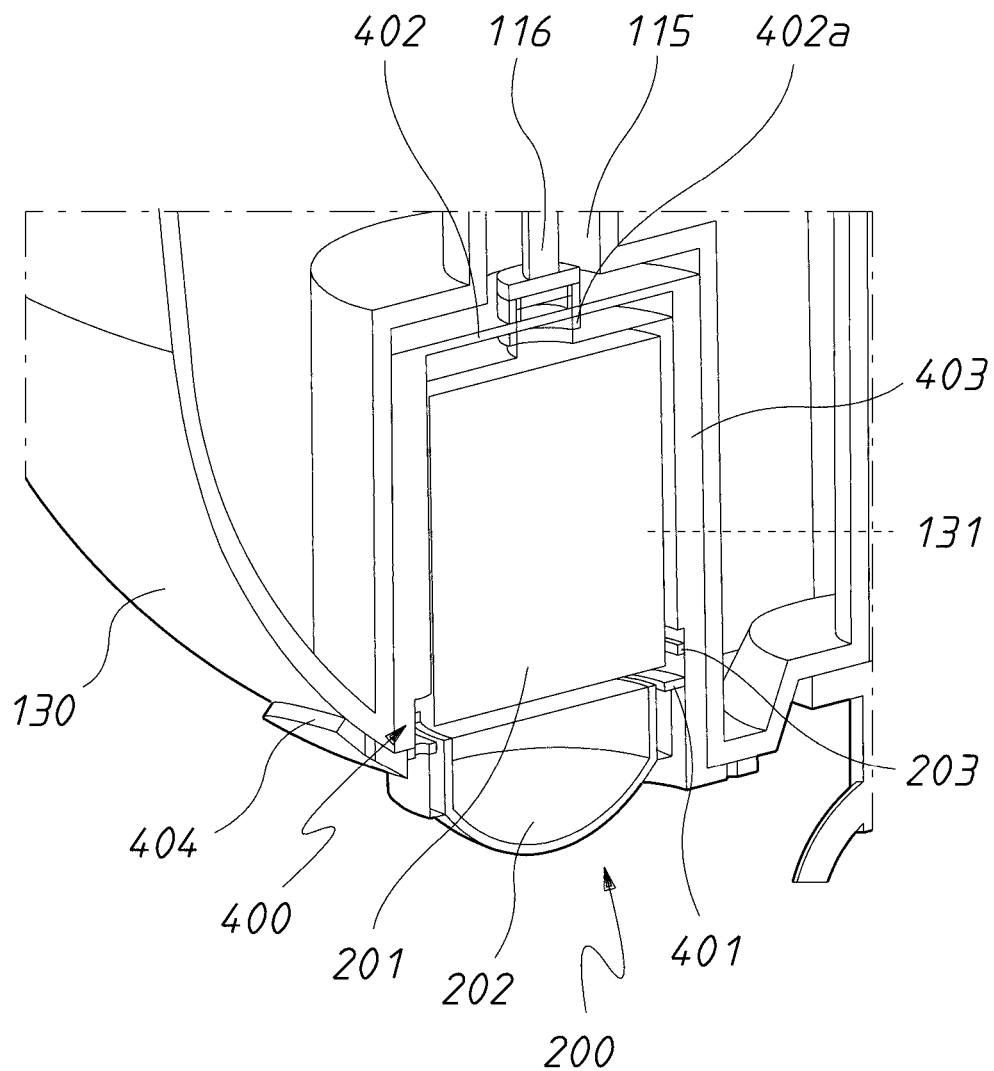
FIG. 5 shows an enlarged partial cross-sectional perspective view of one of a plurality of recesses of a buoyant body of the system.

Further referring to FIG. 4 (an exploded view of the system) and FIG. 5 (an enlarged partial cross-sectional perspective view of one of the modular units 200), the system further comprises a plurality of receptacles 400. The receptacles 400 substantially receive the modular units 200 and are substantially received by the recesses 131, respectively. The modular units 200 in this embodiment are waterproof and correspond in shape to the receptacles 400. Each receptacle 400 is provided with a locking mechanism in the form of a locking ring 401 for releasably locking the corresponding modular unit 200 substantially within the respective receptacle 400, thereby preventing unintentional removal of the corresponding modular unit 200 from the respective receptacle 400.

While the receptacles 400 are shown to be separable from the respective modular units 200, the receptacles 400 may, in an alternative embodiment, be integrally formed with the respective modular units 200.

Specifically, each receptacle 400 is hollow and cylindrical in shape, and has a base portion 402, a wall portion 403 and a flange portion 404. The base portion 402 is disc-shaped. The wall portion 403 extends perpendicularly from a peripheral edge of the base portion 402, surrounds the corresponding modular unit 200, and sealingly (i.e., watertightly) abuts against the corresponding inner surrounding wall of the lower body portion 130. The flange portion 404 extends radially and outwardly away from the wall portion 403 and is arranged distal to the base portion 402. The flange portion 404 is configured to conform in curvature to an outer surface of the lower body portion 130. With such a configuration, the flange portion 402 sealingly abuts against the outer surface of lower body portion 130. The base portion 402 and the wall portion cooperate to define a first receiving space for receiving the corresponding modular unit 200. The base portion 402 is formed with an annular ridge 402a extending into the first receiving space to facilitate wired communication with the corresponding modular unit 200.

As can be seen in FIG. 5, each modular unit 200 comprises a hollow body portion 201 and a hollow dome-shaped portion 202 connected to one end of the body portion 201. The body portion 201 is cylindrical in shape and serves to house electronic components (not shown). In this embodiment, the modular units 200 comprise sensors disposed in the body portions 201 thereof. The electronic components comprise sensors operable for detecting water properties (e.g., pH and temperature), sensors for capturing images and sensors for picking up or capturing audio signals. Depending on need, other types of sensor may be used, such as sensors operable to emit and detect sonar signals.

Each receptacle 400 is configured to cooperate with the buoyant body to substantially prevent ingress of water into the buoyant body through and between the receptacle 400 and the buoyant body. Each receptacle 400 is further configured to cooperate with the respective modular unit 200 to substantially prevent ingress of water into the buoyant body through and between the receptacle 400 and the respective modular unit 200. That is to say, the inner surrounding walls in the lower body portion 130, the receptacles 400 and the modular units 200 cooperate to substantially prevent ingress of water into the buoyant body there-through. Each modular unit 200 is provided with a water-sealing ring 203 for substantially preventing ingress of water through and between the modular unit 200 and the corresponding receptacle 400.

The system further comprises an engagement mechanism for releasably engaging each of the modular units 200 substantially with the buoyant body, either via the receptacle or directly if the receptacle and modular unit are integrally formed. In the present embodiment, the engagement mechanism is a key-and-keyway engagement mechanism that reduces the likelihood of damage due to incorrect insertion of the modular unit 200 as well as insertion of non-compatible modular units 200 into the receptacles 400. It is worth noting that, in other embodiments, other types of engagement mechanism (e.g., electrical and mechanical), may be employed in place of, or in conjunction with, the key-and-keyway engagement mechanism.

It is envisaged that one or more of the modular units 200 need to be removed under certain circumstances. The system further comprises a plurality of blanks (not shown) to be received by the recesses 131 upon removal of the modular units 200 from the recesses 131, respectively. Each blank corresponds in weight to the modular unit 200 removed from the corresponding recess 131 so that balance of the buoyant body is maintained.

Figure 6:
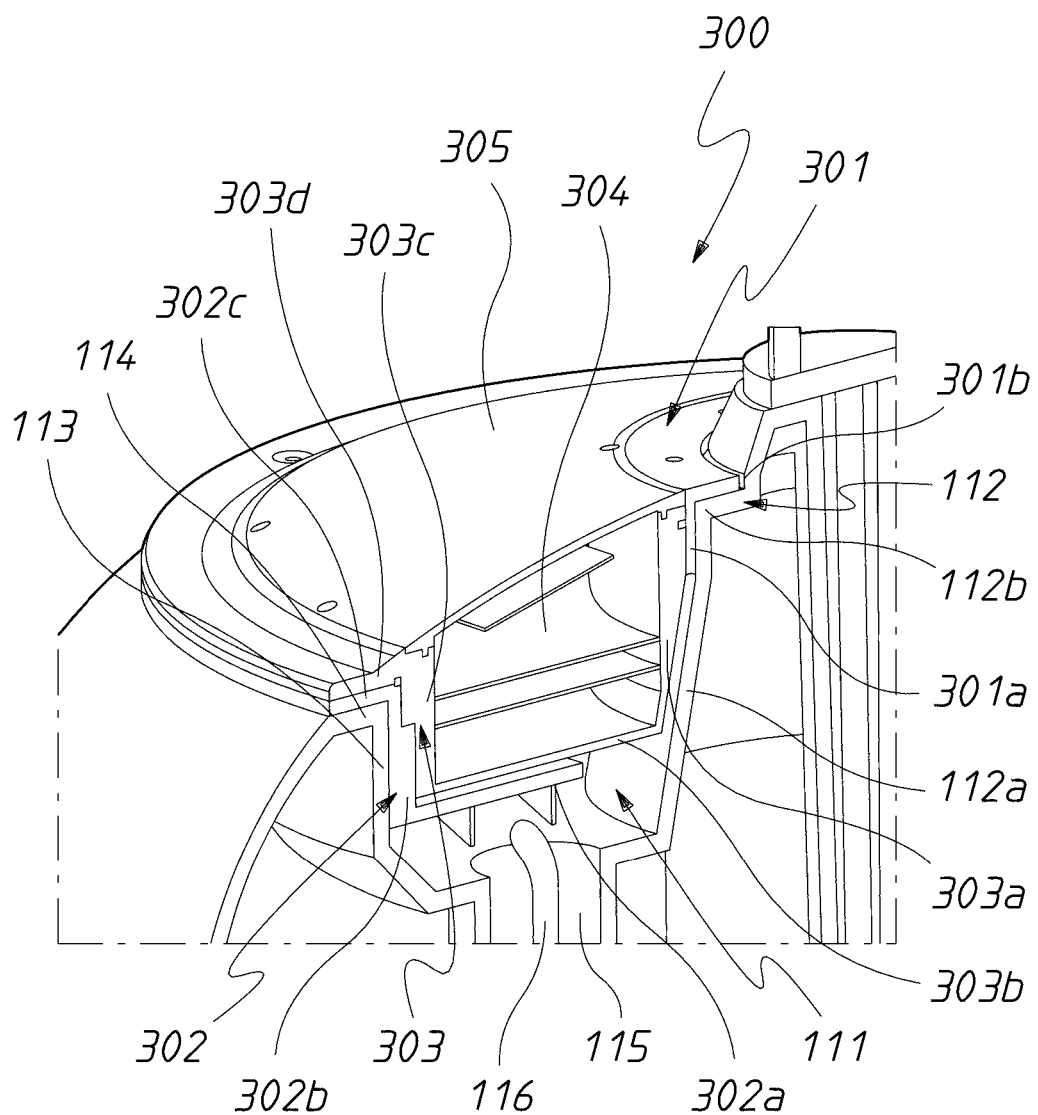
FIG. 6 shows an enlarged partial cross-sectional perspective view of a controller assembly of the buoyant body.

Further referring to FIG. 6 (an enlarged partial cross-sectional perspective view of the controller assembly 300), the upper body portion 110 of the buoyant body arranged to receive the controller assembly 300, which comprises an inner sealing ring 301, an outer sealing ring 302, a seat tray 303, an electronic stack 304 and a cover 305.

The upper body portion 110 is formed with an outwardly opening annular cavity 111 arranged concentric to the central axis "I", and a central protrusion 112 which protrudes outwardly and concentrically (or coaxially) along the central axis "I" and around which the annular cavity 111 is formed. The central protrusion 112 has a fructoconical section 112a and a shoulder section 112b. The fructoconical section 112a has a radius reducing away from the lower body portion 130. The shoulder section 112b extends from a narrow end of the fructoconical section 118.

The inner sealing ring 301 is sleeved onto the central protrusion 112. In particular, the inner sealing ring 301 has a wall section 301a and a flange section 301b extending radially and inwardly from an upper end of the wall section 301a. The inner sealing ring 301 corresponds in profile to and sealingly abuts against the shoulder section 112b of the central protrusion 112.

The upper body portion 110 has an inner wall section 113 surrounding substantially the central protrusion 112 and cooperating therewith to define the annular cavity 111 therebetween. The upper body portion 110 further has an inner shoulder section 114 extending from an upper end of the inner wall section 113.

The outer sealing ring 302 has a base section 302a, a wall section 302b and a flange section 302c. The base section 302a extends radially and inwardly from a lower end of the wall section 302b. The flange section 302c extends radially and outwardly from an upper end of the wall section 302b. With such an arrangement, the wall section 302b and the flange section 302c corresponds in profile to and sealingly abut against the inner wall section 113 and the inner shoulder section 114 of the upper body portion 110. The wall section 302b is formed with an inner circumferential step.

The seat tray 303 has an inner wall section 303a, a base section 303b, an outer wall section 303c and a flange section 303d. The base section 303b radially interconnects a lower end of the inner wall section 303a to a lower end of the outer wall section 303c. The flange section 303d extends radially and outwardly from an upper end of the outer wall section 303c. The inner wall section 303a corresponds in profile to and sealingly abuts against the inner sealing ring 301 and is spaced apart from the fructoconical section 112a. The base section 303b is disposed on the base section 302a of the outer sealing ring 302. The outer wall section 303c corresponds in profile to and sealingly abuts against the wall section 302b of the outer sealing ring 302. In particular, the outer wall section 303c is formed with an outer circumference step correspondingly engaging the inner circumferential step of the wall section 302b. The flange section 303d sealingly abuts against the flange section 302c. The sections 303a-303c co-operate to define a second receiving space.

The electronic stack 304 comprises a controller unit, a communication interface, and a power module. The controller unit serves to control operation of the system. The communication unit is operable for wiredly and/or wirelessly transceiving signals with the modular units 200 and any other associated devices (e.g., a server device). For example, the communication unit may be configured for communication over, for example, a 4G cellular network or the like. The communication unit may also be configured to wirelessly read data from an eTag or the like. The electronic stack 304 may also comprise a global positioning system (GPS) module for determining GPS coordinates of the buoyant body. The communication unit may also communicate wirelessly with other communication units within other buoys that are located close enough to enable communication between the buoys to occur. A wireless mesh network may be created to enable a buoy to communicate with other buoys in the mesh network using the respective communication units.

The power module is operable for powering the system. The electronic stack 304 takes the form of a disc with a hole at a centre thereof, and is arranged in the second receiving space cooperatively defined by the sections 303a-303c.

The cover 305 is formed with a circumferential ridge for sealingly engaging a corresponding circumferential groove formed in the upper end of the outer wall section 303c of the seat tray 303. The cover 305 serves to provide protection for the electronic stack 304 from an environment of use, and cooperates with the seat tray 303 to substantially prevent ingress of water there-through.

For each recess 131, the buoyant body is further formed with a duct 115 spatially interconnecting the recess 131 and the cavity 111. This arrangement allows the controller unit of the electronic stack 304 to wiredly communicate with each of the modular units 200 via the respective duct 115. Specifically, each duct 115 is provided with a suitable wired communication means 116 (e.g., a cable or a harness) extending from the cavity 111 towards the corresponding modular unit 200 along the respective duct 115. As can be seen from FIGS. 3, 5 and 6, the wired communication means 116 extends towards the corresponding receptacle 400 for electrical communication with the corresponding annular ridge 402a. With such a configuration, when each modular unit 200 engages the corresponding annular ridge 402a, operative electrical communication between the modular unit 200 and the controller unit via the corresponding wired communication means 116 and the corresponding annular ridge 402a is enabled. The modular unit 200 may also be wiredly powered by the power module via the corresponding wired communication means 116 and the corresponding annular ridge 402a.

In an alternative embodiment, the modular units 200 are capable of wireless communication (e.g., Bluetooth, ZigBee and Wi-Fi) with the controller unit, thereby eliminating the need for the ducts 115. It should also be noted that, in one arrangement, the modular unit 200 is in wired communication and wireless communication with the controller unit. Such an arrangement is useful in reducing communication failure between the modular unit 200 and the controller unit. In one embodiment, physical engagement of the modular units 200 with the buoyant body via the receptacles 400 triggers the modular units 200 to engage in wireless communication with the controller unit. However, triggering of the modular units 200 for wireless communication with the controller unit may be otherwise implemented. For example, in an alternative implementation, the modular units 200 may be manually activated for wireless communication with the controller unit prior to insertion into the respective recesses 131. It is also worth noting that the modular units 200 may be wirelessly powered by the power module of the electronic stack 304 by way of induction. The power module may comprise a battery. The power module may comprise energy harnessing means for harnessing energy from one or more natural resources. For example, the energy harnessing means may be a solar panel. The solar panel may provide a means for charging the battery. The battery may be charged using wireless inductive charging means. The harnessed energy may be supplied to one or more of the electronic components of the electronic stack 304, the modular units 200 and the battery. The energy may be supplied via a wireless inductive means. Alternatively, each modular unit 200 may be provided with and powered by a respective battery (e.g., an internal battery).

The controller unit is operatively associated with a server device (not shown), and is operable to receive data (e.g., data pertaining to the sensors of the modular units 200) from the modular units 200, and to wirelessly transmit information corresponding to the data received by the controller unit to the associated server device. For example, the data received by the controller unit may be raw data, and the information sent to the server device may be information obtained from the raw data. Alternatively, the raw data received by the controller unit may be forwarded to the server device for processing by the server device.

The system of the present disclosure has numerous advantages compared to the conventional mooring buoy. For example, where the electronic components in the modular units 200 become faulty, replacement of the modular units 200 is relatively easy. In contrast, with the conventional mooring buoy, the entire PCB must be replaced, which is laborious and costly. In addition, in the process of PCB replacement, normal operation of the system is interrupted. Such a PCB replacement also results in wastage of non-faulty components.

In addition, configuration (e.g., exchange) of the modular units 200 is facilitated by virtue of the design of the outwardly facing recesses 131 and the water sealing arrangement of the buoyant body, the receptacles 400 and the modular units 200 whereby ingress of water is substantially prevented. That is, a modular unit 200 to be exchanged or removed may be externally accessed with ease. In other words, there is no need to access an inner compartment for such an exchange, which may involve, for example, loosening screws and removing covers. Such a design of the buoy 100 facilitates function customization, allowing exchange of the modular units 200 of the same or different functions, according to need. In other words, the modular units 200 have a "configurable design".

Moreover, the design where the modular units 200 are substantially received by the respective recess 200 reduces force experienced by the modular units 200 from the environment of use, thereby reducing wearing of the modular units 200. Furthermore, the dome-shaped portion 202 exposed from the respective recess 131 contributes to the reduction of such force experienced by the modular unit 200.

In one arrangement, the mooring eye 306 may be associated with a tensometer (not shown) operatively associated with the controller unit to measure a tensile property of the mooring eye 306. In another arrangement, some of the modular units 200 are formed with respective outward facing mooring eyes (not shown) and are associated with respective tensometers (not shown), which are operatively associated with the controller unit to measure a tensile property of the respective mooring eyes. Such arrangements are useful for accurate detection of mooring of marine vessels to the mooring eye 306 and/or the mooring eyes of the modular units 200. In particular, where a tensometer detects a tensile property exceeding a threshold (e.g., a predetermined threshold), the controller unit determines that a marine vessel is moored to the corresponding mooring eye of the buoy 100. Further, the tensometer can provide feedback of mooring conditions, such as those occurring during extreme conditions during storms and high winds.

Arrangement of the recesses is not limited to that shown in the figures. For example, the recesses 131 may be disposed on an imaginary plane perpendicular to the axis "I" and opening radially away from the axis "I". Such an arrangement of the recesses 131 may facilitate detection of the tensile property by the tensometers of the modular units 200. In particular, for each modular units 200, the corresponding recess 131 opens substantially in the direction in which tension is applied to the mooring eye of the modular unit by the corresponding marine vessel.

It should be noted that the buoy 100 may be otherwise configured for mooring of marine vessels. For example, the buoy 100 may be provided with a mooring eye on the lower body portion 130 and arranged at the axis "1".

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "receiving" and its derivatives, as used herein, are intended to mean "receiving substantially".

The invention claimed is:

1. A modular mooring buoy system comprising:
   a buoyant body having an associated controller unit, said buoyant body being formed with at least one outwardly opening recess; and
   at least one modular unit removably received by said at least one recess in a watertight manner to enable operative communication between said controller unit and said at least one modular unit,
   wherein said at least one modular unit comprises at least one of a sensor operable to detect a water property, a sensor operable to capture images, and a sensor operable to capture audio signals, and
   wherein said controller unit is separate from said at least one modular unit and wirelessly communicates with said at least one modular unit for said controller unit to receive data pertaining to said at least one sensor.

2. The system of claim 1, wherein said at least one recess is provided with at least one receptacle, said at least one receptacle being received by said at least one recess, said at least one receptacle receiving said at least one modular unit, said at least one receptacle being provided with a locking mechanism for releasably locking said at least one modular unit within said at least one receptacle.

3. The system of claim 1, further comprising an engagement mechanism for releasably engaging said at least one modular unit with said buoyant body.

4. The system of claim 3, wherein said at least one engagement mechanism comprises a key and a keyway corresponding to said key.

5. The system of claim 1, further comprising at least one blank to be removably received by said at least one recess upon removal of said at least one modular unit from said at least one recess.

6. The system of claim 5, wherein said at least one blank corresponds in weight to said at least one modular unit.

7. The system of claim 1, wherein said controller unit is operable to wirelessly transmit to an associated server device information corresponding to the data received by said controller unit.

8. A mooring buoy comprising:
   a buoyant body; and
   a controller unit associated with said buoyant body, said buoyant body being formed with at least one outwardly opening recess, said at least one recess being adapted to removably receive at least one modular unit in a watertight manner to enable operative communication between said controller unit and the at least one modular unit,
   wherein said at least one modular unit comprises at least one of a sensor operable to detect a water property, a sensor operable to capture images, and a sensor operable to capture audio signals, and
   wherein said controller unit is separate from said at least one modular unit and wirelessly communicates with said at least one modular unit for said controller unit to receive data pertaining to said at least one sensor.

9. The mooring buoy of claim 8, wherein said at least one recess is provided with at least one receptacle, said at least one receptacle being received by said at least one recess, said at least one receptacle being adapted to receive the at least one modular unit, said at least one receptacle being provided with a locking mechanism adapted for releasably locking the at least one modular unit within said at least one receptacle.

10. The mooring buoy of claim 8, the at least one modular unit being associated with a first portion of an engagement mechanism, wherein said buoyant body further comprises a second portion of the engagement mechanism for releasably engaging the first portion of the engagement mechanism.

11. The mooring buoy of claim 10, the first portion of the engagement mechanism comprising one of a key and a keyway corresponding to the key, wherein said second portion of the engagement mechanism comprises the other one of the key and the keyway.

12. The mooring buoy of claim 8, said at least one recess is further adapted for removably receiving at least one blank upon removal of the at least one modular unit from said at least one recess.

13. The mooring buoy of claim 8, wherein said controller unit is adapted to wirelessly transmit to an associated server device information corresponding to the data received by said controller unit.

14. A modular unit for use with a buoyant body having an associated controller unit, the buoyant body being formed with an outwardly opening recess, wherein said modular unit is adapted to be received removably by the recess in a watertight manner to enable operative communication between said modular unit and the controller unit, wherein said modular unit comprises at least one of a sensor operable to detect a water property, a sensor operable to capture images, and a sensor operable to capture audio signals, and wherein said modular unit wirelessly communicates with said controller unit for said controller unit to receive data pertaining to said at least one sensor.

15. The modular unit of claim 14, the buoyant body being associated with a first portion of an engagement mechanism, said modular unit comprising a second portion of the engagement mechanism for releasably engaging the first portion of the engagement mechanism.

16. The modular unit of claim 15, the first portion of the engagement mechanism comprising one of a key and a keyway corresponding to the key, wherein said second portion of the engagement mechanism comprises the other one of the key and the keyway.

17. The system of claim 1, wherein said at least one modular unit is provided with and powered by a respective battery.

18. The mooring buoy of claim 8, wherein said at least one modular unit is provided with and powered by a respective battery.

19. The modular unit of claim 14, wherein said modular unit is powered by a respective battery.

20. The system of claim 1, wherein said at least one modular unit is arranged to trigger the wireless communication with said controller unit upon physical engagement of said at least one modular unit to the buoyant body.

* * * * *